3,333,948
HERBICIDAL MIXTURE AND METHOD

Tetsuo Takematsu, Utsunomiya, Kumao Ohashi, Nagoya, and Masaru Kado, Shimizu, Japan, assignors to Toa Gosei Kagaku Kogyo Kabushiki Kaisha, Tokyo, and Ihara Chemicals Company Limited, Shimizu, Japan, both corporations of Japan
No Drawing. Filed Dec. 7, 1964, Ser. No. 416,643
Claims priority, application Japan, Dec. 14, 1963, 38/67,279, 38/67,280
3 Claims. (Cl. 71—118)

The present invention relates to herbicidal compositions containing 3,4-dichloropropion anilide (as abridged DCPA) and 2-(1-cyclohexenyl)cyclohexanone (as abridged CHCH) and more particularly the herbicidal compositions composed of DCPA and CHCH in a mixing ratio by weight of 1:0.2–3.

DCPA has been used in practice as contact type herbicides of intergeneric preferential property having an activity of killing various weeds without injuring rice plant genera such as paddy field rice plant and upland rice plant. DCPA is generally prepared as an emulsifiable concentrate, which when using is diluted to a concentration of 0.2–0.4% with water and spread on stems and leaves of the growing plant. When the conventional emulsifiable concentrate of DCPA is prepared into the spraying liquid, the DCPA is often crystallized off. Furthemore, even after sprayed, needle crystals may sometimes be separated on the plant. When DCPA is used in a rainy season, the crystals after sprayed flow off from the plant by rain thereby considerably reducing the herbicidal activity. These facts result in delay of the herbicidal activity, uncertain effect and phytotoxical spots on useful plants and are an important problem in the practical use of emulsifiable concentrate of DCPA and the improvement is desired.

After numerous investigations about the DCPA compositions, the inventors have discovered the fact that CHCH is a considerably excellent particular solvent which is in liquid state at room temperature and a water insoluble stable compound which well dissolves DCPA and also dissolves wax-like substance on the plant body and penetrates rapidly into the plant. Furthermore, CHCH itself has a herbicidal activity and an emulsifiable concentrate mainly consisting of CHCH is prepared, and if the dilute aqueous solution of the concentrate is sprayed on stems and leaves of plants, the herbicidal indication is appeared from 0.2% of CHCH concentration and at 1% of CHCH concentration the preferential weeds in an agriculture field such as barnyard grass (*Echinochloa crusgalli* P. Beauv.) and crabgrass (*Digitaria adscendens* Henr.) are completely killed. Particularly, the characteristic of the herbicidal activity of CHCH consists in the rapid effect property in which the effect appears so rapidly that 30 minutes after sprayed on the plants the harmful indication can be observed and after 3 hours leaves suspend with fading phenomenon. As above explained, CHCH is characterized by contact herbicidal property but CHCH has the following disadvantages that larger amount of the CHCH composition than that of DCPA is necessary to attain the same effect so that it is uneconomical practically and the safety range for plants (width of preferential activity) is narrow.

The composition consisting of DCPA and CHCH according to the invention does not crystallize off DCPA both in a dilute solution and on leaves after sprayed and not only improves the penetration into the plant body but also appears herbicidal activity in a high speed of from several to several tens times by an auxiliary effect of CHCH. Accordingly, the decrease of effect due to rain can be prevented so that it is possible to expect a large extension of the using period.

Furthermore, the absorbability by plant is increased and the incompleteness of effect in a cold period or a cold area is improved, thereby increasing the degree of utilization greatly.

The mixing ratio of CHCH to DCPA is preferably more than 0.05 part by weight with respect to 1 part by weight of DCPA, and in an amount less than the ratio as shown by the following experimental results, the crystallization of DCPA begins 2 days after spraying the composition, so that it is not desirable.

With the blend within the range of 0.2–3 parts of CHCH per 1 part of DCPA the compositions show an extremely larger synergistic effect than the sum of each effect when used as a sole composition respectively and CHCH dissolves thoroughly DCPA so that, when the dilute solution is prepared the crystallization does not occur and when sprayed on the plants the compositions penetrate into the plant body easily and rapidly while maintaining intergeneric preferential property of killing the following undesirable weeds: barnyard grass (*Echinochloa crusgalli* P. Beauv.), crabgrass (*Digitaria abscendens* Henr.), goose grass (*Eleusine indicia* Gaertn.) green foxtail (*Setaria viridis* P. Beauv.), green pigweed (*Chenopodium album* var. *centrorubrum* Makino), smartweed (*Polygonum conspicuum* Nakai), Frenchweed (*Galinsoga parviflora* Cavanilles), chickweed (*Stellaria media* Cry.), milk pirslane (*Euphorbia supina* Rafin.), cudweed (*Gnaphalium japonicum* Thumb.), Rotala indicia Koehne, *Dopatrium junceum* Hamilt, waterwort (*Elatine triandra* Schk.), pickerelweed (*Monochoria vaginalis* Presl.), autumn rush (*Fimbrietylis littoralis* Gaudich.), without giving harmful effect to rice plant genera to appear the herbicidal activity rapidly. The composition of the invention shows 3–4 times larger effect 2 days after spraying and 2–3 times larger effect after 10 days if compared with use of DCPA only. CHCH of more than 3 to 1 of DCPA is not suitable since the characteristics of the latter is lost.

In the preparation of the compositions according to the invention, a carrier may be mixed but the term "carrier" used here means such a material to be used in order to dilute the active ingredients, and it may be a solid or liquid.

For example, the carrier may be materials which are solvent for DCPA and CHCH and materials which are non-solvent but can disperse or dissolve these ingredients by means of additives. The examples of the carrier are water, liquid hydrocarbons such as benzene, kerosene, alcohols, acetone, methyl naphthalene and cyclohexanone, animal or vegetable oils, fatty acids and fatty acid esters.

Furthermore, it is preferable to use together with surfactants such as spreader, emulsifier, wettable agent and adhesive which are additives to be used in agricultural chemicals in order to make the effect more positive.

The examples of the compositions according to the invention are explained in the following, but additives and the mixture ratios can be varied over a wide range.

EXAMPLE 1

Thirty-five g. of DCPA, 30 g. of xylene and 25 g. of emulsifier, Solpole (trade name, made by Toho Kagaku Kogyo Co., Ltd.) were mixed and 10 g. of CHCH was added to the mixture. 100 g. of the resulting composition were diluted with 25 lit. of water, and the solution was used as spraying liquid.

EXAMPLE 2

Thirty-five g. of DCPA, 33 g. of xylene and 20 g. of emulsifier, Solpole were mixed and 12 g. of CHCH was added to the mixture. 100 g. of the resulting composition were diluted with 25 lit. of water, and the solution was used as spraying liquid.

EXAMPLE 3

Thirty-five g. of DCPA, 10 g. of cyclohexanone, 12 g. of xylene and 25 g. of emulsifier, New Kalgen (trade name, made by Takemoto Yushi Co., Ltd.) were mixed and 18 g. of CHCH was added to the mixture. 100 g. of the resulting composition were diluted with 25 lit. of water, and the solution was used as spraying liquid.

EXAMPLE 4

Thirty-five g. of DCPA, 5 g. of xylene and 25 g. of emulsifier, Solpole were mixed and 35 g. of CHCH was added to the mixture. 100 g. of the resulting composition were diluted with 30 lit. of water, and used as spraying liquid.

By the following experimental examples, the activity and effect of the compositions of the invention are demonstrated. The sample liquids were prepared by diluting the mixture of 35 g. of DCPA, 50 g. of xylene and 15 g. of Solpole, on the one hand, and the mixture of 50 g. of CHCH, 40 g. of the xylene and 10 g. of Solpole, on the other, with water, respectively, to the specified concentration. Where indicated in the tables, the sample DCPA liquid and sample CHCH liquid were used separately for reference purposes.

Experimental Example 1

Experiment for the prevention of crystallization and decrease of phytotoxicity.

(a) Process of experiment:

Paddy field rice plant seeds (species *Kinnapu*) were seeded on each pot of 12 cm. dia. and at its five leaf stage 20 cc. of each composition were sprayed by glass nozzle and after 2 days and 10 days the determinations were effected. The numbers of crystallization are those developed between 5 cm. of the leaf blade (central portion) in needle state and are average values of three leaves.

(b) Results:

| Exp. No. | Compound | Concentration, percent | Crystallization number 2 days after treating | Phytotoxicity for paddy field rice plant (5 leaves period) 2 days after treating | 10 days after treating |
|---|---|---|---|---|---|
| 1 | DCPA | 0.2 | 54.3 | — | — |
| 2 | DCPA / CHCH | 0.2 / 0.1 | 0 | — | — |
| 3 | DCPA / CHCH | 0.2 / 0.05 | 0 | — | — |
| 4 | DCPA / CHCH | 0.2 / 0.02 | 0 | — | — |
| 5 | DCPA / CHCH | 0.2 / 0.01 | 8.2 | — | ± |
| 6 | Water | — | — | — | — |

Exp. Nos. 2–5 are the compositions according to the invention. Exp. No. 1 and No. 6 are comparative examples.
++: Middle harm.
+: Small harm.
—: No harm.

Experimental Example 2

Experiment for effect of rain in contact treatment of the mixture of DCPA and CHCH on barnyard grass (*Echinochloa crusgalli* P. Beauv.).

(a) Process of experiment:

15 barnyard grass (*Eichinochloa crusgalli* P. Beauv.) (2 leaves period) previously seeded in small pots were selected and 1, 3, 6 and 24 hours after spraying 3 ml. of the liquid of different concentrations by glass nozzle, 5 mm. and 10 mm. of artificial rains were applied respectively and the effects of the compositions were determined to check the influence due to rain. This artificial rains were performed by raining 5 mm. (450 cc.) and 10 mm. (900 cc.) on vats having a definite area (900 cm.²) by means of a ladle type sprayer to spend 15 minutes in the 5 mm. of artificial rain and 30 minutes in the 10 mm. The determinations were carried out one week after the treatment.

(b) Results:

| Exp. No. | Compound | Concentration (percent) | Amount of Rain 0 mm. | 5 mm. | | | | 10 mm. | | | |
|---|---|---|---|---|---|---|---|---|---|---|---|
| | | | | Hours Before Raining After Spraying the Composition | | | | | | | |
| | | | 0 | 1 | 3 | 6 | 24 | 1 | 3 | 6 | 24 |
| 1 | DCPA | 0.3 | 100 | 54 | 78 | 89 | 100 | 52 | 68 | 76 | 100 |
| 2 | DCPA | 0.2 | 100 | 30 | 52 | 74 | 89 | 26 | 45 | 58 | 80 |
| 3 | DCPA / CHCH | 0.2 / 0.1 | 100 | 100 | 100 | 100 | 100 | 100 | 100 | 100 | 100 |
| 4 | DCPA / CHCH | 0.2 / 0.05 | 100 | 100 | 100 | 100 | 100 | 92 | 100 | 100 | 100 |
| 5 | DCPA / CHCH | 0.2 / 0.02 | 100 | 96 | 100 | 100 | 100 | 80 | 98 | 100 | 100 |
| 6 | DCPA / CHCH | 0.2 / 0.01 | 100 | 85 | 100 | 100 | 100 | 76 | 83 | 100 | 100 |
| W | Nontreated | | | | | | | | | | |

Exp. Nos. 3–6: The compositions of the invention. The other Exp. No.: Comparative examples. The numerals in the table show kill ratio.

$$\text{Kill Ratio} = \frac{100 n_5 + 75 n_4 + 50 n_3 + 25 n_2}{N}$$

$n_5$: 100% number of killed leaves; $n_4$: 75% number of killed leaves; $n_3$: 50% number of killed leaves; $n_2$: 25% number of killed leaves; N: Total number of leaves.

Experimental Example 3

Experiment for effect and phytotoxicity with mixture of DCPA and CHCH (I).

(a) Process of experiment:

In wooden box of 800 cm.$^2$ packed with upland soil were seeded 50 seeds each of paddy field rice (species, Kinnapu and barnyard grass (*Echinochloa crusgalli* P. Beauv.) and after the germination at 3 leaves period (plant length of 7 cm.), 10 ml. per one box of the dilute liquid were spread on the whole surface of the box. After one week the degrees of injury for paddy field rice plant and barnyard grass (*Echinochloa crusgalli* P. Beauv.) were determined.

Experimental Example 4

Experiment for effect and phytotoxicity with mixture of DCPA and CHCH (II).

(a) Process of experiment:

The seeds of paddy field rice plant and crabgrass (*Digitaria adscendens* Henr.) were seeded on pots and when they developed to the 2 leaves period, the leaves were treated with the total surface contact. 2 days and 10 days after the treatment the determinations were effected to obtain the following results.

| Exp. No. | Compound | Concentration, percent | General condition for paddy field rice plant | | | Number of barnyard grass | |
|---|---|---|---|---|---|---|---|
| | | | No. of sound leaves | No. of half killed leaves | No. of killed leaves | Kill | Sound |
| 1 | DCPA | 0.1 | 5 | 6 | 1 | 14 | 34 |
| 2 | DCPA | 0.2 | 5 | 4 | 1 | 27 | 18 |
| 3 | DCPA | 0.3 | 3 | 4 | 2 | 45 | 0 |
| 4 | CHCH | 0.05 | 8 | 0 | 0 | 0 | 48 |
| 5 | CHCH | 0.2 | 8 | 0 | 0 | 9 | 41 |
| 6 | CHCH | 0.3 | 6 | 2 | 0 | 16 | 32 |
| 7 | CHCH | 0.5 | 5 | 4 | 0 | 28 | 23 |
| 8 | {DCPA / CHCH} | {0.2 / 0.02} | −5 | 3 | 2 | 29 | 18 |
| 9 | {DCPA / CHCH} | {0.25 / 0.05} | 7 | 2 | 0 | 45 | 0 |
| 10 | {DCPA / CHCH} | {0.2 / 0.05} | 7 | 3 | 0 | 47 | 0 |
| 11 | {DCPA / CHCH} | {0.1 / 0.05} | 6 | 3 | 0 | 37 | 8 |
| 12 | {DCPA / CHCH} | {0.2 / 0.1} | 4 | 5 | 2 | 48 | 0 |
| 13 | {DCPA / CHCH} | {0.1 / 0.1} | 5 | 4 | 1 | 41 | 3 |
| 14 | {DCPA / CHCH} | {0.2 / 0.2} | 4 | 4 | 1 | 46 | 0 |
| 15 | {DCPA / CHCH} | {0.1 / 0.2} | 7 | 4 | 1 | 38 | 1 |
| 16 | {DCPA / CHCH} | {0.05 / 0.15} | 7 | 2 | 0 | 30 | 9 |
| 17 | {DCPA / CHCH} | {0.04 / 0.16} | 8 | 0 | 0 | 12 | 33 |
| 18 | {DCPA / CHCH} | {0.06 / 0.24} | 7 | 1 | 0 | 14 | 32 |
| 19 | Nontreated | | 14 | 0 | 0 | 0 | 45 |

Exp. Nos. 8–18: The compositions of the invention. The other exp.: Comparative examples.

(b) Results:

| Exp. No. | Compound | Concentration, percent | Killed ratio for crabgrass | | Killed ratio for paddy field rice plant | |
|---|---|---|---|---|---|---|
| | | | After 2 days | After 10 days | After 2 days | After 10 days |
| 1 | DCPA | 0.3 | 100 | 100 | 11 | 23 |
| 2 | DCPA | 0.2 | 74–50 | 100 | 0 | 0 |
| 3 | DCPA | 0.15 | 48 | 52–78 | 0 | 0 |
| 4 | DCPA | 0.1 | 24 | 28–53 | 0 | 0 |
| 5 | CHCH | 0.3 | 26–53 | 54 | 0 | 0 |
| 6 | CHCH | 0.2 | 9 | 11 | 0 | 0 |
| 7 | CHCH | 0.15 | 0 | 0 | 0 | 0 |
| 8 | CHCH | 0.07 | 0 | 0 | 0 | 0 |
| 9 | {DCPA / CHCH} | {0.15 / 0.15} | 100–78 | 100 | 0 | 0 |
| 10 | {DCPA / CHCH} | {0.15 / 0.1} | 100–76 | 100 | 0 | 0 |
| 11 | {DCPA / CHCH} | {0.15 / 0.07} | 78 | 100 | 0 | 0 |
| 12 | {DCPA / CHCH} | {0.1 / 0.1} | 79 | 100 | 0 | 0 |
| 13 | {DCPA / CHCH} | {0.1 / 0.07} | 75 | 100–78 | 0 | 0 |
| 14 | {DCPA / CHCH} | {0.1 / 0.05} | 72–51 | 100–75 | 0 | 0 |
| 15 | Nontreated | | | | | |

Exp. Nos. 9–14: The compositions of the invention. The other examples: Comparative examples. The numerals in the table show kill ratio.

$$\text{Kill ratio} = \frac{100\, n_5 + 75\, n_4 + 50\, n_3 + 25\, n_2}{N}$$

$n_5$: 100% number of killed leaves; $n_4$: 75% number of killed leaves; $n_3$: 50% number of killed leaves; $n_2$: 25% number of killed leaves; $N$: Total number of leaves.

What we claim is:

1. A herbicidal composition comprising an admixture of one part by weight 3,4-dichloropropionanilide and about 0.2–3 parts by weight 2-(1-cyclohexenyl) cyclohexanone in combination with a carrier, said admixture being present in said composition in a quantity sufficient to selectively control the growth of plant life.

2. A herbicidal composition in accordance with claim 1 wherein said admixture is present in said composition in an amount equal to at least 0.1% by weight.

3. A method of selectively killing undesirable plants in rice fields by spreading thereon a toxic quantity of an admixture of 1 part by weight 3,4-dichloropropionanilide and about 0.2–3 parts by weight of 2-(1-cyclohexenyl) cyclohexanone in combination with a carrier.

References Cited

UNITED STATES PATENTS

| 2,676,881 | 4/1955 | Bennett | 71—2.3 |
| 3,154,398 | 10/1964 | McRae | 71—2.3 |

FOREIGN PATENTS

| 635,604 | 1/1962 | Canada. |

LEWIS GOTTS, *Primary Examiner.*

JAMES O. THOMAS, Jr., ELBERT L. ROBERTS, *Examiners.*